Patented Apr. 8, 1952

2,591,811

UNITED STATES PATENT OFFICE 2,591,811

UNSATURATED CARBINOL RELATED TO VITAMIN A AND PROCESS OF PREPARING SAME

Ian Morris Heilbron and Basil Charles Leicester Weedon, London, Ewart Ray Herbert Jones, Manchester, Benjamin Arthur Hems, Northolt, and Alexander Bertus Arnold Jansen, London, England, assignors to Glaxo Laboratories Limited, Greenford, England, a British company No Drawing. Application March 7, 1950, Serial No. 148,266. In Great Britain March 22, 1949

9 Claims. (Cl. 260—617)

This invention is concerned with improvements in or relating to the preparation of a new unsaturated carbinol, namely 3:7-dimethyl-1-(2':6':6' - trimethylcyclohex - 1' - enyl) - nona-3:5:7-trien-1-yn-9-ol which may be represented by the following structural formula:

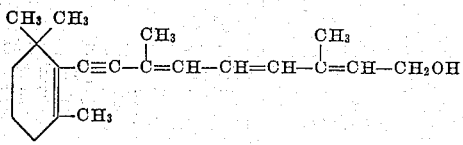

and which compound is believed to be of use in the synthesis of vitamin A.

We have found that the new carbinol may be prepared by the allylic rearrangement of 3:7-dimethyl-1-(2':6':6'-trimethylcyclohex - 1'-enyl)-nona-4:6:8-trien-1-yn-3-ol by treatment of the last mentioned compound with an aqueous acidic medium as herein defined which reaction may be represented as follows:

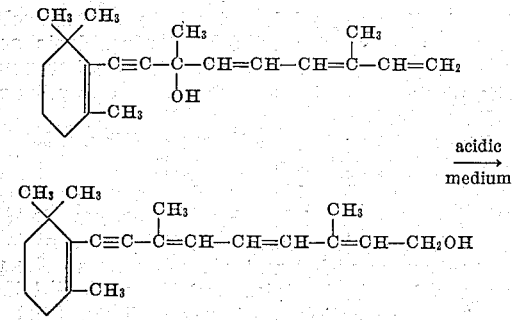

Accordingly the invention comprises the new compound 3:7 - dimethyl - 1-(2':6':6'-trimethylcyclohex - 1'-enyl) - nona-3:5:7-trien-1-yn-9-ol represented by the following structural formula

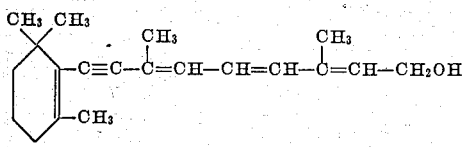

According to a further feature of the invention we provide a process for the preparation of 3:7-dimethyl - 1 - (2':6':6' - trimethylcyclohex - 1'-enyl)-nona-3:5:7-trien-1-yn-9-ol in which 3:7-dimethyl - 1 - (2':6':6' - trimethylcyclohex - 1'-enyl)-nona-4:6:8-trien-1-yn-3-ol is treated with an aqueous acidic medium as herein defined.

The term "a suitable aqueous acidic medium" as used herein means an aqueous solution having a pH less than 7. The concentration of hydrogen ions in the medium may be varied according to the substances present in the medium and the conditions under which the reaction takes place; too high a concentration of acid and/or the presence of substances having strong oxidizing properties in the medium should preferably be avoided as such conditions may cause decomposition, oxidation or the like of the desired product. In general we have found that organic acids are less suitable than inorganic acids, although it has been found possible to use oxalic acid. The use of acid salts would not fall outside the scope of the present invention, and the suitability of any acid medium can readily be determined by preliminary experiment.

We prefer according to a further feature of the invention to use an acidic medium consisting of an aqueous solution of an inorganic acid having non-oxidizing properties the concentration of the acid in the medium being within the range of from 2.5–10% by weight. Thus for example we have found that a 5% by weight aqueous solution of sulphuric acid is suitable for the process according to the invention. Examples of other inorganic acids which may be used are hydrochloric and phosphoric acid.

According to one method of carrying out the process according to the invention a solution of the starting material in an inert water immiscible solvent, such as ether, benzene and the like is brought into contact with the suitable acidic medium, for example by shaking or stirring. We prefer however, to achieve partial or complete miscibility of the organic and aqueous phases by the use of inert water miscible solvents such as dioxane. The term "inert" as used herein is intended to refer to a solvent having itself no demonstratable reaction on the reactants or the products of the reaction.

The reaction is preferably carried out at temperatures within the range of from 0° C. to 40° C. and may be effected by continuously shaking or stirring the reaction mixture for several hours.

The reaction is also preferably carried out in an inert atmosphere for example in an atmosphere of nitrogen. A trace of an anti-oxidant such for example as hydroquinone or a tocopherol, is also preferably added to the reaction mixture.

The stated new compound, in the purest form we have been able to obtain shows the following characteristics:

Refractive index $(n_D^{15°}) = 1.6010$
Melting point: 47–50° C.

Light absorption: 252 and 328 mµ
$E_{1cm.}^{1\%}$ 677 and 1242 respectively.
$\epsilon$ 20,000 and 37,000 respectively.

It will be understood that these characteristics were determined on the purest material we have been able to obtain and may be subject to variation dependant on the purity of the product.

3:7 - dimethyl - 1 - (2':6':6' - trimethylcyclohex - 1' - enyl) - nona - 4:6:8 - trien - 1 - yn - 3-ol may be prepared by any convenient method but at present we prefer to use the method described in our copending application Serial No. 148,265, filed March 7, 1950.

In order that the invention may be well understood the following examples of methods of carrying it into effect are given only as illustrations:

Example 1.—Using sulphuric acid

3:7 - dimethyl - 1 - (2':6':6' - trimethylcyclohex - 1' - enyl) - nona - 4:6:8 - trien - 1 - yn-3-ol (4 g.) in ether (40 c. c.) was shaken with 5% aqueous sulphuric acid (200 c. c.) and a little hydroquinone for 24 hours. The ethereal solution was washed with sodium bicarbonate solution and water, dried and evaporated. The residue (3.8 g.) showed absorption maxima at 317, 304 and 231 mµ, $E_{1cm.}^{1\%}$=472, 494 and 491 respectively.

Example 2.—Using oxalic acid

A solution of the starting material (0.5 g.) in ether (10 ml.) was shaken mechanically with 5% w/v aqueous oxalic acid (30 ml.) for 24 hours, in a nitrogen atmosphere and in the presence of a trace of hydroquinone. The ether layer was separated, washed with saturated sodium bicarbonate solution and water, and dried over anhydrous magnesium sulphate. Evaporation of the solvent under vacuum gave a viscous oil containing 3:7-dimethyl-1-(2':6':6'-trimethylcyclohex - 1'-enyl) - nona - 3:5:7 - trien - 1 - yn - 9-ol. $n_D^{15°}$ 1.5650.

U. V. Absorption  Inflex 294–312 mµ  $\left[\begin{array}{l}^{1\%} = 432 \\ _{1\ cm.} = 434 \end{array}\right.$
max 231 mµ

Example 3.—Using potassium bisulphate

A solution of the starting material (0.5 g.) in ether (10 ml.) was treated as in 1 with 5% w/v aqueous potassium bisulphate solution (30 ml.). Evaporation of the solvent gave a viscous oil $n_D^{15°}$ 1.5600.

U. V. Absorption  Inflex 289–309 mµ  $\left[\begin{array}{l}^{1\%} = 425 \\ _{1\ cm.} = 422 \end{array}\right.$
max 228 mµ

Example 4.—Using phosphoric acid

A solution of the starting material (0.5 g.) in benzene (10 ml.) was treated as before with 5% w/v aqueous phosphoric acid (30 ml.). Removal of the solvent gave an oil $n_D^{15°}$ 1.5650.

U. V. Absorption  Inflex 297–308 mµ  $\left[\begin{array}{l}^{1\%} = 411 \\ _{1\ cm.} = 493 \end{array}\right.$
max 233 mµ

Example 5.—Use of homogeneous reaction conditions

In the following experiments the reaction was carried out in a homogeneous medium using an organic solvent containing 20% water and using an acid at a concentration of 0.1%. The reaction was carried out in the usual way at room temperature, in the dark, in an atmosphere of nitrogen and in the presence of a small amount of anti-oxidant.

(a) To a solution of 3:7-dimethyl-1-(2':6':6'-trimethylcyclohex - 1' - enyl) - nona - 4:6:8-trien-1-yn-3-ol (4.0 g.) in acetone (320 ml.) containing a few drops of $\alpha$-tocopherol, was added a cold solution of sulphuric acid (0.25 ml.) in distilled water (80 ml.) to give a homogeneous solution, the acid concentration being 0.1%.

After standing two hours in the dark, at room temperature and under an atmosphere of nitrogen, saturated sodium bicarbonate solution (600 ml.) was then added, and the mixture extracted with petrol of B. P. 40–60°. The extracts were dried over magnesium sulphate and the solvent removed in vacuo, ultimately at a pressure of $10^{-4}$ mm. 3:7-dimethyl-1-(2':6':6'-trimethylcyclohex - 1' - enyl) - nona - 3:5:7-trien-1-yn-9-ol remained as a viscous yellow oil (4.0 g.). $n_D^{15°}$ 1.5910.

Light absorption (n-hexane) Max. 3280 Å; 2520 Å. $\epsilon$ 26,200; 14,200 respectively.

Microanalysis: Found: C, 84.2; H, 9.8. $C_{20}H_{28}O$ requires C, 84.5; H, 9.8%.

(b) *Using potassium hydrogen sulphate.*—To a solution of the starting material (0.5 g.) in dioxan (40 ml.) containing a little $\alpha$-tocopherol, a solution of potassium hydrogen sulphate (0.05 g.) in water (10 ml.) was added. After 2 hours standing the solution was poured into sodium bicarbonate solution and the product isolated as previously described. (0.5 g.) $n_D^{14°}$ 1.5755.

Light absorption (n-hexane) Max. 3250 Å; 2530 Å. $\epsilon$ 19,100; 14,100 respectively.

(c) *Using oxalic acid.*—To a solution of the starting material (0.5 g.) in acetone (40 ml.), containing a little $\alpha$-tocopherol, a solution of oxalic acid (0.05 g.) in water (10 ml.) was added. The product was isolated in the usual manner after standing for 2 hours. (0.5 g.) $n_D^{14°}$ 1.5650.

Light absorption (n-hexane) Max. 3220 Å; 2530 Å. $\epsilon$ 18,900; 14,100 respectively.

(d) *Using hydrochloric acid.*—To a solution of the starting material (0.5 g.) in ethyl alcohol (40 ml.) a solution of 0.5% hydrochloric acid (10 ml.) was added. After keeping for two hours the product was isolated as above (0.5 g.) $n_D^{14°}$ 1.5767.

Light absorption (n-hexane) Max. 3260 Å; 2520 Å. $\epsilon$ 21,300; 14,100 respectively.

(e) *Using phosphoric acid.*—To a solution of the starting material (0.5 g.) in acetone (40 ml.) a solution of phosphoric acid (0.03 ml.) in water (10 ml.) was added and after two hours the rearranged product was isolated (0.5 g.) $n_D^{14°}$ 1.5856.

Light absorption (n-hexane) Max. 3200 Å; 2530 Å. $\epsilon$ 20,900; 14,100 respectively.

We claim:

1. As a new compound, 3:7 - dimethyl - 1-(2':6':6' - trimethylcyclohex - 1' - enyl) - nona-3:5:7-trien-1-yn-9-ol represented by the following structural formula:

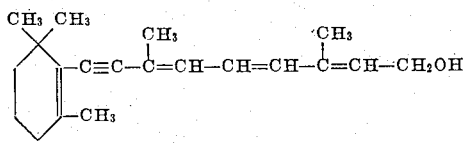

2. As a new compound an unsaturated carbinol of formula $C_{20}H_{28}O$ having the following characteristics:

Refractive index ($n_D^{15°}$) = 1.6010
Melting point = 47–50° C.
Light absorption. max. 252 and 328 mµ
$E_{1cm.}^{1\%}$ 677 and 1242 respectively.
$\epsilon$ 20,000 and 37,000.

3. A process for the preparation of 3:7-dimethyl - 1 - (2':6':6'-trimethylcyclohex-1'-enyl)-nona-3:5:7-trien - 1 - yn - 9 - ol in which 3:7 - dimethyl - 1-(2':6':6' - trimethylcyclohex-1'-enyl)-nona-4:6:8-trien-1-yn-3-ol is treated with an aqueous acidic medium the pH of which is less than 7.

4. A process as claimed in claim 3 in which the aqueous acidic medium consists of an aqueous solution of an inorganic acid, the concentration of acid in the medium being within the range of from 2.5-10% by weight.

5. A process as claimed in claim 3 in which the aqueous acidic medium is a 5% by weight solution of sulphuric acid.

6. A process as claimed in claim 3 in which an inert water-miscible organic solvent selected from the group consisting of dioxane and acetone is added to the reaction mixture whereby the reaction is rendered homogeneous.

7. A process as claimed in claim 3 in which the starting material is dissolved in an inert water-immiscible organic solvent selected from the group consisting of ether and benzene and the resulting solution agitated with the aqueous acidic medium.

8. A process as claimed in claim 3 in which the reaction is carried out at a temperature within the range of from 0–40° C.

9. A process as claimed in claim 3 in which the reaction is carried out in an inert atmosphere and in the presence of an anti-oxidant.

IAN MORRIS HEILBRON.
BASIL CHARLES LEICESTER WEEDON.
EWART RAY HERBERT JONES.
BENJAMIN ARTHUR HEMS.
ALEXANDER BERTUS ARNOLD JANSEN.

REFERENCES CITED

The following references are of record in the file of this patent:

Cheeseman, Heilbron, Jones, Sondheimer, Weedon: Journal Chemical Society, 2031–2035, August 1949, (London).